United States Patent
Brewer et al.

[11] 3,717,402
[45] Feb. 20, 1973

[54] LIGHT COLLECTOR FOR GAMMA RAY CAMERAS

[75] Inventors: Allen Brewer; Michael Joy, both of Toronto, Ontario, Canada

[73] Assignee: Canadian Patents and Development Limited, Ottawa, Ontario, Canada

[22] Filed: Dec. 8, 1969

[21] Appl. No.: 883,095

[30] Foreign Application Priority Data

Dec. 16, 1968  Great Britain......................59,685/68

[52] U.S. Cl.................................................350/286
[51] Int. Cl..............................................G02b 5/04
[58] Field of Search.................350/286, 96 A, 287; 356/209-212, 239

[56] References Cited

UNITED STATES PATENTS

| | | | |
|---|---|---|---|
| 3,129,691 | 4/1964 | Walker | 350/96 |
| 3,144,643 | 8/1964 | Andersson | 350/96 |
| 3,308,709 | 3/1967 | Harrick | 350/96 |
| 3,370,502 | 2/1968 | Wilks, Jr. | 350/96 |

Primary Examiner—David Schonberg
Assistant Examiner—Michael J. Tokar
Attorney—Douglas S. Johnson

[57] ABSTRACT

A light collector for use in an optical system for collecting light falling outside a predetermined area, the collector comprising an elliptical plate of transparent material having an opening therethrough from one face to the other centered on one of its foci to allow unimpeded passage therethrough of light falling within the desired predetermined area, the plate being adapted to intercept and collect light falling outside the area around such one focus, the plate having a refracting surface arrangement providing for total internal reflection when the light strikes the plate faces or employing a reflective coating on such plate faces except in the vicinity of the foci to effect entrapment of such collected light between the plate faces, the plate having a reflective coating on the periphery thereof to direct such entrapped light from the one focus to the other focus whereby the intercepted light is collected at such other focus and means are provided at such other focus to reflect such collected light out through one of the plate faces.

8 Claims, 2 Drawing Figures

INVENTOR.
ALLEN BREWER
MICHAEL JOY
BY Douglas S. Johnson

LIGHT COLLECTOR FOR GAMMA RAY CAMERAS

FIELD OF INVENTION

This invention relates to improvements in Gamma Ray Cameras or the like and more particularly to a light collector for use in the optical systems of such cameras.

The invention has application to various forms of such cameras particularly where they are to be employed in recording weak sources of gamma ray energy at high speeds. For example, cameras particularly benefitting from the invention are high speed medical gamma ray cameras which are utilized to photograph rapidly changing isotope distributions involving relatively low concentrations of the isotopes.

BACKGROUND OF INVENTION

In gamma ray cameras the gamma rays given off by the source to be photographed after collimation are directed to strike a phosphor screen which may be a single crystal or a mosaic of crystals such as sodium iodide and are converted into scintillations of light. These scintillations which occur on the phosphor screen create the signals of interest when finally converted to picture elements.

To intensify the scintillations which in total constitute the image produced by the phosphor they are fed to the photocathode of an image intensifier. The photocathode, which is optically coupled to the phosphor screen converts each scintillation into a corresponding small pencil of electrons which are focused on an output phosphor screen corresponding to the input screen which reconverts the electrons into a light flash or scintillation.

Normally two or more image intensifiers are required and therefore the scintillations from the output screen or phosphor of the first image intensifier is delivered for further processing, e.g. through a suitable lens system to a second image intensifier employing a photocathode and an output crystal screen or phosphor.

Because of the low isotope concentrations commonly used for example in clinical studies it is very difficult to distinguish the desired picture information from any background noise in the form of spurious scintillations. In this connection it has been observed that thermally generated electrons of the order of 30,000 per second are emitted from the photocathode. This source of random background scintillations has the effect of fogging the desired picture of the varying gamma ray radiation intensifier being given off by the object or source under inspection.

To overcome this problem of fogging it has been proposed to discriminate against low energy events such as those due to single electron emissions and to render the camera system operative only when a picture even is recognized. Such a system is described in our paper entitled High Speed Medical Gamma Ray Cameras reported in the Digest of the 6th International Conference of Medical Electronics 1965 Tokyo at page 224.

In order to render the camera inoperative to such spurious date as random photocathode electron emission, a sample of the light emission from the first Image Intensifier is taken and analyzed for recognizable picture event characteristics as opposed to simple noise.

The presence of a picture event can be detected by examining the decay rate of the resulting signal produced by energizing the phosphor screens of the image intensifier, such decay rate corresponding to the decay rate of the cascaded phosphors.

Scintillations produced by mere thermally generated electrons have a much shorter duration and can therefore be distinguished on analysis from the picture events. When a picture event is recognized the subsequent image intensifier or intensifiers are gated to open and pass the picture intelligence.

Because of the low energy levels involved, it will be understood that essentially all the useable light energy output from the output phosphor screen of the first image intensifer is required to be passed on for optimum picture results and it has been found a problem to collect enough light emanating from the output phosphor screen of the image intensifier to sample effectively without serious depleting the quantum of light to be passed on through the lens system of the camera for further processing.

SUMMARY OF THE INVENTION

It is the object of this invention to provide a means of effectively collecting light from the initial stage or stages of image intensification for effective sampling or analyzing without reducing the quantum of light to be passed on from the image intensifier for subsequent processing if, on analysis, it is found to contain a picture event.

More particularly it is the object of the invention to provide a means of efficiently collecting light, preferably from the initial image intensifying stage, which otherwise would be lost in processing through to the next stage whereby a sufficient quantum of light is made available for effective analyzation to ensure operation of a reliable gate control means to render the camera system operative only to photograph useful picture information.

According to the invention the desired quantum of extraneous light from an image intensifier stage is collected by an elliptical plate of transparent material so constructed and arranged that the waste light which is scattered to fall outside the collecting capabilities of the subsequent optical system falls thereon and is entrapped in the material of the plate and directed onto an appropriate light detector such as a photo multiplier from which it is available so that it can be analyzed to determine the appropriate camera gating.

BRIEF DESCRIPTION OF DRAWINGS

The invention will be more fully understood from the following detailed description having reference to the accompanying drawings in which

With reference to FIG. 1, $I_1$ represents an image intensifier which, as will be understood, produces electron ray pencils by the energization of a photocathode in optical contact or optically coupled with a phosphor screen on which the gamma rays it is desired to detect, impinge. These electron rays are accelerated to enhance the scintillation brilliance of the initial phosphor screen and are directed to impinge on the output phosphor screen $P_2$ which may for example comprise a mosaic of sodium iodide crystals. The crystal elements of the screen $P_2$ are thus energized to give off scintillations which are then applied to an appropriate optical system O for further processing. Because of the limited gain of the image intensifier $I_1$, it is essential that at least 1 percent of the light energy emanating from the phosphor $P_2$ be collected and delivered to a photo multiplier M to provide sufficient energy for amplification and reliable analysis so that effective gate control of the remainder of the camera system can be obtained.

Figure 1:
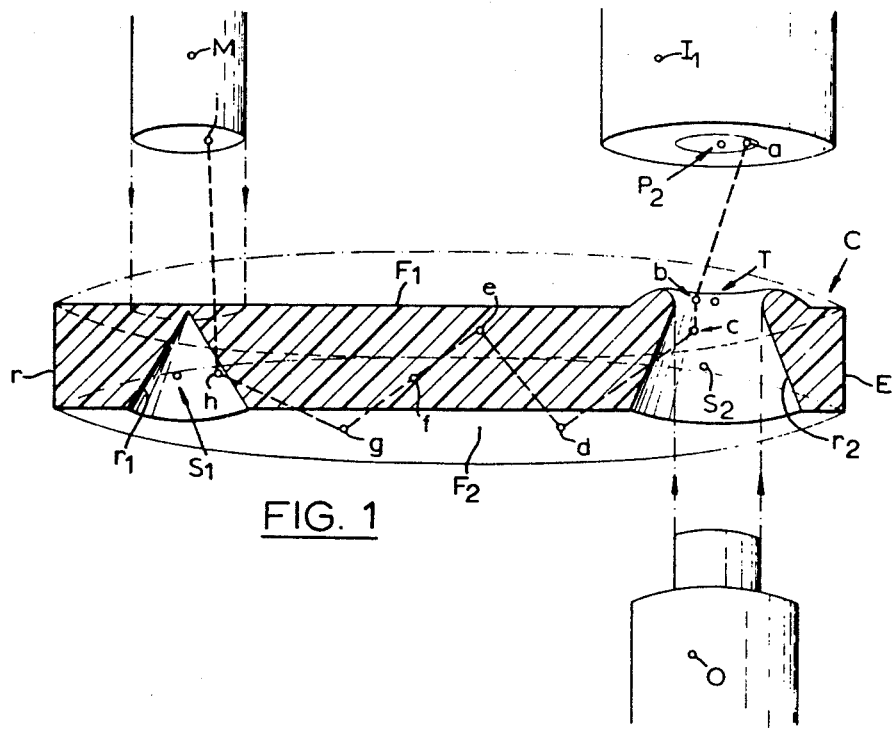
FIG. 1 is an exploded, part perspective, part diagrammatic view showing one form of light collector embodying the invention split along its major axis and showing its relation to the relevant camera components.

It should be pointed out that, in addition to the necessity of avoiding the blockage of useable light to the optical system O, because of the high electronic and magnetic fields and the limited space in the immediate vicinity of the intensifier $I_1$ and the optical system O, it is impossible to place the photo multiplier M close enough to the phosphor $P_2$ to simply intercept the required fraction of its emission. The present invention however overcomes these problems by the provision of the collector C which as illustrated in FIG. 1 comprises an elliptical plate of a suitable transparent material such as lucite which has its peripheral surface E coated with a reflective material $r$ e.g. evaporated aluminum and is provided at one of its foci with a frusto conical opening $S_2$ centered on such focus. The smaller end of the opening $S_2$ is of a size to fit the lens system O which is adapted to fit into the recess so that its end is flush with the upper face or surface $F_1$ of the collector plate C. Surrounding the smaller end of the opening $S_2$ is a toroidal boss T. At the opposite focus of the elliptical collector plate C and centered on such focus there is provided a conical recess $S_1$ which extends inwardly from the lower face $F_2$ of the collector plate C and terminates essentially at the upper face $F_1$. The photo multiplier M as illustrated by the dotted lines and arrows is adapted to seat down on the upper face $F_1$ of the plate C with its axis coinciding with the axis of the conical recess $S_1$ and hence coinciding with such second focus of the plate C. The surfaces of the frusto conical opening $S_2$ and the conical recess $S_1$ are also coated with a suitable reflective material such as evaporated aluminum and indicated at $r_2$ and $r_1$ respectively so that they will reflect light rays which strike them from their inner side. The remaining uncoated surfaces of the plate C namely $F_1$ and $F_2$ and the boss T are polished.

The intensifier $I_1$ is adapted to be mounted close to the plate C and its spacing shown in the diagram is exaggerated for purposes of illustration.

It will be appreciated that the useful light from the output phosphor $P_2$ of the intensifier $I_1$ within the area of the lens system O will travel through the lens system unimpeded However, light spreading outwardly outside the area of the optical system O will fall on the boss T which provides a refracting surface at an angle to the planes of the plate faces $F_1$ and $F_2$. A typical light ray falling within this category can be traced as follows:

The light ray originating from the point a on the phosphor $P_2$ escaping outside the area of the optical system O strikes point b on the toroidal surface T. At b the toroidal surface causes it to be refracted and the beam enters the plate C and continues inside the plate to point c on the surface of the frusto conical opening $S_2$ where it is reflected by the reflective coating $r_2$ on such surface. The ray next strikes one of the elliptical faces $F_2$ of the collector plate C at d. By virtue of the presence of the boss T whose surfaces are inclined relative to the parallel faces $F_1$ and $F_2$ the ray after being reflected by the coating $r_2$, will strike this face $F_2$ at such point d at such an angle that it will undergo total internal reflection and be turned inwardly into the plate to strike the opposite face at point e at such an angle that it again undergoes total internal reflection. Thus the ray becomes trapped between the two parallel elliptical faces $F_1$ and $F_2$ of the plate. When the ray finally strikes the peripheral surface E of the plate C at point f it will be reflected by the coating r on that surface. Because the surface E is perpendicular to the elliptical faces, the ray will continue to be trapped inside the collector in any travel between the upper and lower elliptical faces. Also because of the elliptical shape of the collector the ray will tend to be directed from the one focus centered by the opening $S_2$ toward the other focus centered by the recess $S_1$ after its reflection on the surface E. Thus it next reflects at g and then strikes the conical surface of the conical recess $S_1$ at h where it is reflected by the coating $r_1$ on that surface and into the multiplier M.

It will be understood that the light path above described is simply a typical ray path of a single ray and all other corresponding rays will have generally corresponding paths. The net result will be that essentially the total escaping light will be directed into the collector plate to be entrapped between the faces $F_1$ and $F_2$ and will be directed by the elliptical reflecting surface E from the focus centered on the axis of opening $S_2$ towards the focus centered on the recess $S_1$ where it will be released and directed at the photo multiplier M by the reflecting surface $r_1$.

In this manner the light collector plate C collects the light that does not strike the lens system O and would otherwise be lost and upon collection this light is sufficient for analyzing as desired.

Figure 2:
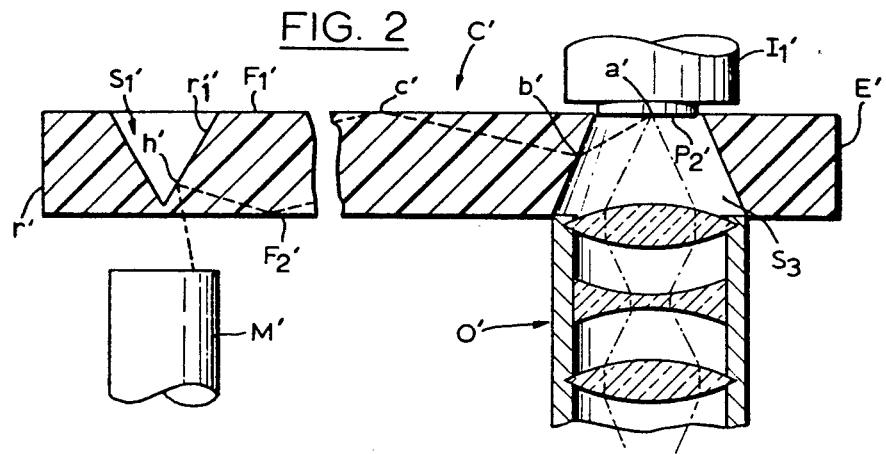
FIG. 2 is a broken away mid vertical sectional view of another form of light collector embodying the invention.

The collector plate C' shown in FIG. 2 is an elliptical plate of transparent material similar to FIG. 1 having a peripheral surface E' provided with a suitable reflective coating r', and upper and lower elliptical faces $F_1'$ and $F_2'$. Plate C' is adapted for use with an image intensifier $I_1'$ which affords access to the phosphor screen $P_2'$ so that the plate can enclose such screen. To this end plate C' is provided with a frusto conical opening $S_3$ therethrough having its axis coinciding with one of the foci of the plate and with its smaller end at the upper face $F_1'$ and its larger end at lower face $F_2'$. The phosphor screen $P_2'$ of the image intensifier $I_1'$ is adapted to fit the smaller end of the opening $S_3$ and the optical system O' is adapted to fit the larger end at the opening $S_3$ at the lower plate face $F_2'$. In this case the surface of the opening $S_3$ will not be coated.

At the opposite focus the plate C' is provided with a conical recess $S_1'$ having its axis coincident with such focus and extending inwardly from the upper face $F_1'$ to adjacent the lower face $F_2'$. Again a reflective coating $r_1'$ is applied to the surface of the conical recess $S_1'$ to reflect light falling thereon.

Again the plate C' forms a collector to collect light from the screen P$_2$' falling outside the optical system o' and to direct it from adjacent the one focus of the plate at which the elements P$_2$' and O' are located to the other focus at which the recess S$_1$' is located, the coated surface r' of such recess serving to direct the light outwardly to a photo multiplier M'.

Thus, for example, ray emanating from a point a' on the phosphor P$_2$' and falling outside the optical system O' strikes the inclined surface of the frusto conical opening S$_3$ at b' where it is refracted into the plate C' to strike face F$_1$' at c' at an angle such as to cause total internal reflection. This light ray will continue to travel through plate C' trapped between surfaces F$_1$' and F$_2$' by total internal reflection and reflected by coating r' elliptical surface E' from one focus towards the other until it strikes surface r$_1$' at h' from which it is directed outwardly to photo multiplier M'.

In FIGS. 1 and 2 the light emanating from the source is directed by a surface inclined to the plate faces such that the angle of incidence of the rays when striking the plate surfaces are such as to cause total internal reflection to thereby entrap the light between the plate surfaces. It will be understood however that the entrapment of the light between such surfaces could be effected by coating such surfaces e.g. surfaces F$_1$ and F$_2$ or F$_1$' and F$_2$' except in the areas of the foci with a reflective coating and no special entrant surface such as the toroidal boss T in FIG. 1 or the inclined wall of the frusto conical recess S$_3$ in FIG. 2 would be required.

It will be understood that variations in dimensions of the elliptical collector plate and its precise configuration to accept waste light at one focus and direct it out at the other will vary according to the particular physical dimension, spacing etc. of the relevant component parts of the camera such as the image intensifier, optical system and photo multiplier.

We claim:

1. A light collector for use in an optical system for collecting light falling outside a predetermined area from a distributed light source, the major portion of the light from which falls onto said predetermined area for processing in the system, comprising an elliptical plate of transparent material having an opening therethrough from one face to the other centered on one of its foci to allow unimpeded passage therethrough of the said major portion of light from the source falling within the desired predetermined area, the plate being adapted to intercept light falling outside said area around said one focus, means for effecting entrapment of such intercepted light between the faces of said plate as it disperses from around said one focus, said plate having a reflective coating on the periphery thereof acting to direct such entrapped dispersed light incident thereon arriving along paths of incidence at varying inclinations relative to the periphery and the planes of the faces of said plate towards the other focus whereby the intercepted dispersed light is collected and concentrated around said other focus, and means at said other focus to reflect such collected light out through one of said plate faces.

2. A light collector as claimed in claim 1 in which said plate is provided with a light intercepting surface surrounding said predetermined area which surface is inclined to the planes of the faces of said plate, said intercepting surface being adapted to refract light striking thereon into the plate to follow a path such that total internal reflection occurs at the faces of said plate until such light is reflected by said means at said other focus.

3. A light collector as claimed in claim 2 in which said opening through said plate is substantially frusto conical, the conical wall of said opening forming said light intercepting surface.

4. A light collector as claimed in claim 2 in which said opening through said plate is substantially frusto conical with the area of the smaller end thereof substantially equal to said predetermined area and said smaller end being located at the face, of said plate through which light is adapted to enter said plate said plate having a collar surrounding said smaller opening end, said collar comprising said light intercepting surface, and a reflective coating on the wall of said opening.

5. A light collector as claimed in claim 4 in which said collar is in the form of a toroidal ring.

6. A light collector as claimed in claim 1 in which said plate faces are provided with a reflective coating outside the vicinity of said foci.

7. A light collector as claimed in claim 1 in which said means at said other focus to reflect the collected light comprises a generally conical recess extending inwardly from one face to adjacent the other face from which the light is to be reflected and a reflective coating on the wall of said recess.

8. A light collector comprising an elliptical plate of transparent material having an elliptical peripheral surface normal to a pair of generally planar parallel faces, said plate being adapted to be mounted in an optical system so that normally waste light from a distributed light source falling outside a predetermined area impinges on said plate around one plate focus, while the major portion of light from said light source passes uninterrupted through said plate at said focus to be processed by said system, said plate being constructed and arranged so that such normally waste light impinging around said one plate focus is entrapped between the plate faces throughout the plate area other than in the vicinity of the plate foci as it disperses from around said predetermined area, said elliptical peripheral surface of said plate being coated with a reflective coating acting to direct such normally waste dispersed light incident thereon arriving along paths of incidence at carying inclinations relative to the periphery and the planes of the faces of said plate towards the other focus in such a way that essentially all of the said dispersed light is concentrated adjacent to the said other focus, and means at said other focus to direct such concentrated light arriving adjacent thereto outwardly through one of said faces.

* * * * *